Patented Dec. 29, 1925.

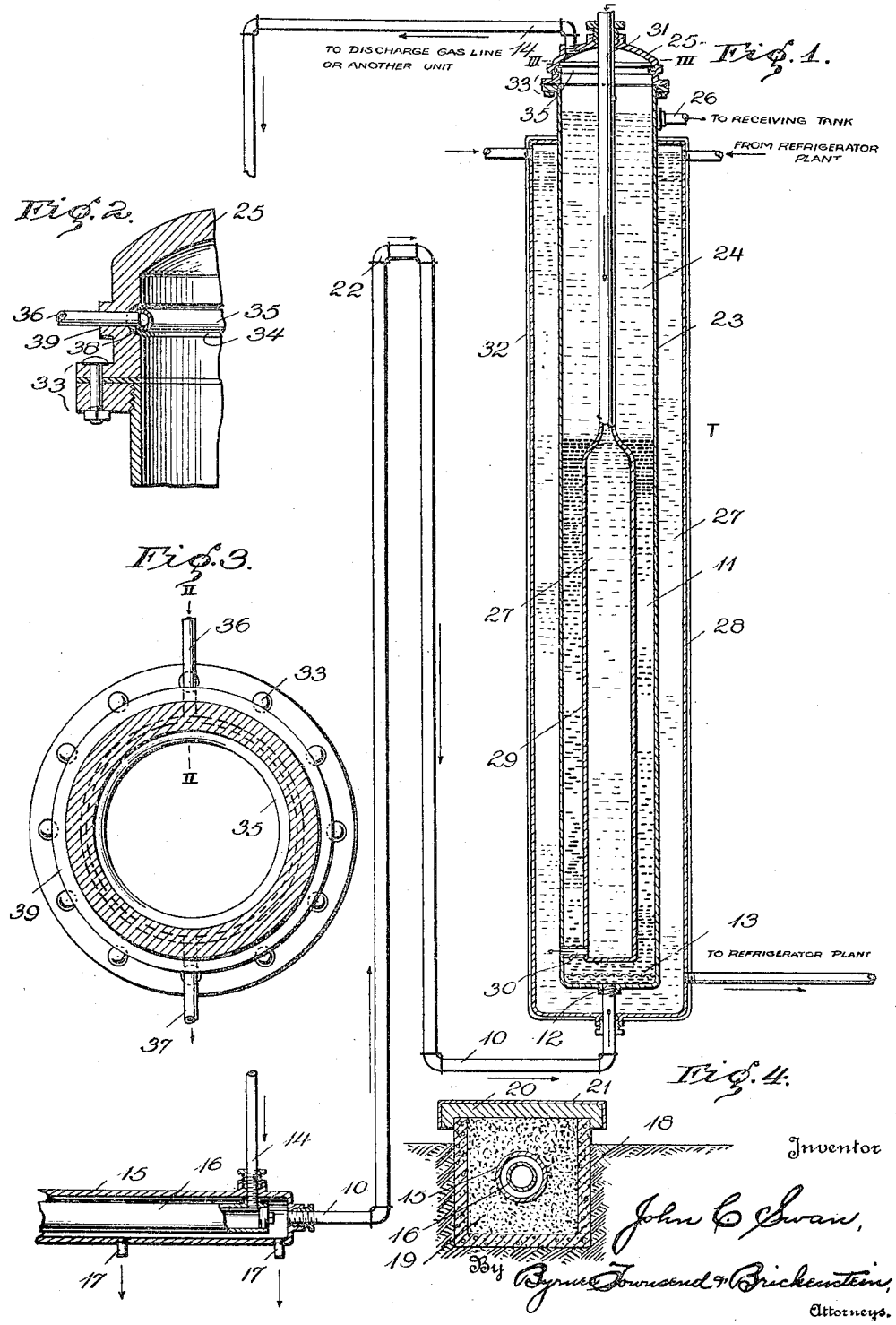

1,568,028

UNITED STATES PATENT OFFICE.

JOHN C. SWAN, OF MARIETTA, OHIO.

METHOD OF SEPARATING CONDENSABLE VAPORS FROM GASES.

Application filed December 15, 1924. Serial No. 756,130.

*To all whom it may concern:*

Be it known that I, JOHN C. SWAN, a citizen of the United States, residing at Marietta, in the county of Washington and State of Ohio, have invented certain new and useful Improvements in Methods of Separating Condensable Vapors from Gases, of which the following is a specification.

The invention relates to the separation of condensable vapors from the carrier gases in which they are found.

The method is especially applicable to the recovery of the vapors carried by methane which is found extensively in petroleum and gas wells. The natural gas contemplated herein consists of a mixture in various relative proportions of methane, ethane, propane, butane, pentane, hexane, heptane and octane. The first four of these elements are non-condensable at atmospheric temperature and pressure and may be termed the lighter combustible constituents of the gas. The last four of these elements, namely pentane, hexane, heptane and octane, are condensable at atmospheric temperatures and pressures and are the gasoline constituents of the gas.

The method of separation hereinafter described is equally applicable to the treatment of the unsaturated series of hydrocarbons known as olefines, and the method may be applied to many other gases outside of the two series named.

The known methods for separating the condensable components, i. e., the gasoline constituents, from natural gas, for example, are limited in commercial practice to the absorption of the vapors by solid or liquid absorbents, or by what is known as the compression method. The first of these methods must be operated intermittently. The compression method is the only continuous method in use for the recovery of gasoline from natural gas or the like and is now unprofitable from the standpoint of first cost, labor and maintenance expense, except under very favorable conditions due to more than an average gasoline content of the gas, "wet gas", and high selling prices of gasoline.

In the present invention I provide a method for separating the condensable vapors which is continuous, highly efficient and very economical in first cost and operation.

According to my invention I contact the gas to be treated with a confined body of liquid which is maintained at a low temperature. This body of liquid hereinafter referred to as the refrigerated liquid, is preferably maintained at the necessary low temperature by immersion of the vessel containing it in a refrigerating liquid which may be continuously circulated between its point or points of contact with the vessel and a refrigerating plant. Preferably the refrigerated liquid is of such relative specific gravity that the condensate or condensates will rise through the liquid and float on the same, and the condensed products are removed from the top of the refrigerated bath. Preferably also the gas to be treated is passed through the refrigerated liquid by introducing it at the bottom of a column of the liquid and causing the gas to be distributed and disseminated through the refrigerated liquid in minute bubbles; the stripped or partially stripped gas being removed at the top of the column.

Before contacting the gas to be treated with the refrigerated body, any water is removed therefrom; and this may be done by employing a heat interchanger, wherein the cold stripped gas from the treater unit passes countercurrent to the gas to be treated. The water content of the gas is thereby condensed and may be removed from the interchanger by any suitable means. If any of the heavier vapor constituents of the gas are condensed and removed with the water, they may be separated from the latter by gravity or otherwise.

The method may be carried out in a single unit, wherein a low temperature may be maintained and all constituents removed which it is desired to condense; or a series of units may be employed, each effecting a separation of a particular product or group of products, the remaining condensable products which require lower temperature for condensation being condensed in the next unit or units of the series. In such a series operation, the partially stripped gas from the first unit is passed into the second and lower temperature unit, preferably at the bottom thereof, and if still further separation is desired the effluent gas from the second unit is introduced into the third unit, etc., etc. Each unit of course has an independent receiving tank for its particular condensate.

As the confined body of refrigerated liquid, I prefer to use a non-absorbent or practically non-absorbent liquid of a higher specific gravity than the condensed vapors so that a physical separation is automatically accomplished, the recovered product floating on the surface of the refrigerated liquid, from which it may be conducted by suitable means to receiving or storage tanks. I prefer to use mercury, more especially in the first unit, assuming that multiple units are to be used; and if all the condensable components are to be removed in one unit, mercury is preeminently the adaptable substance for this purpose. Where additional units are required, as in an automatic rectifying of the products recovered by temperature and, if necessary, pressure differences, ethyl alcohol may replace the mercury as the refrigerated body in such additional units. While it is true that not all the fractions of natural gas are insoluble in alcohol their presence in the liquid is in no wise detrimental to the successful operation of the plant and they may be separated later, if so desired, by well known rectifying means; or the alcohol, after the start of the operation may be eliminated altogether and the particular fraction to be separated in a given unit may be used as the refrigerated body by supercooling. Ethylaniline is also quite suitable for the separation herein described, but is not so available as the other bodies referred to. A saturated solution of calcium chloride may be used; any appropriate expedient being employed to maintain the concentration, for example by using an excess of the calcium chloride or by replenishing as required. Chloroform is also suitable. Other bodies satisfying the requirements of specific gravity, insolubility, substantial immiscibility and non-absorbability may be employed.

From the known laws of heat-interchange, it will be understood that the temperature of the mercury or other refrigerated liquid must be below the condensing temperature of the component to be separated; practically, it must be not materially less than ten degrees lower in temperature.

It is obvious that the gas must carry a minimum pressure equivalent to the vertical height weight of the column of mercury, plus the friction; and no objection, except an economic one, exists to higher pressures which in turn would obviate the necessity for extremely low temperatures in the refrigerated liquid.

As the circulated refrigerating liquid I prefer to use ethyl alcohol, which may be denatured, because of its very low freezing point and its physical effect in keeping the pipes clean and thus favoring heat exchange; also because of its high mobility and low frictional resistance. The alcohol should be at least ten degrees lower in temperature than the refrigerated liquid. I do not intend however to limit myself to the use of the particular refrigerant. Other fluids, such as ammonia, sulfur dioxide, carbon dioxide, propane, etc., can of course be employed, as will readily be understood.

The invention will better be understood by reference to the accompanying drawing, wherein:

Fig. 1 illustrates somewhat diagrammatically a unit suitable for carrying out the process described, certain of the parts being shown in vertical section;

Fig. 2 is a vertical section of one side of the head of a unit on line II—II of Fig. 3;

Fig. 3 is a horizontal section through the head of the unit taken along line III—III of Fig. 1, and enlarged; and Fig. 4 is a transverse section through the underground trough which carries the concentric gas inlet and outlet pipes, composing the heat interchanger.

In carrying out the method in the apparatus shown, the natural gas or other gas to be treated is led to the treater unit T through a pipe 10 and is introduced into the column of mercury or other refrigerated liquid 11 at the bottom thereof through an inlet 12. Over such inlet is provided a wire screen 13 or an equivalent device for effecting a thorough distribution and dissemination of the gas so that it will traverse the refrigerated body in minute bubbles. The stripped or partially stripped gas is removed from above the column of the refrigerated liquid through a suitable conduit 14 and may be passed to a discharge gas line or to another separator unit, in case of operation of a series of units.

For the purpose of condensing any water in vapor form which is carried by the gas to be treated, the latter is preferably passed in heat interchange relation to the stripped gas, the simple arrangement shown at the bottom of the drawing representing one form which the apparatus may take. The gas to be treated passes through the pipe 15 around an enlarged pipe section 16 which connects in any suitable manner with the pipe 14. The pipes and connections are preferably of standard sizes and forms; the pipes 10 and 14 may conveniently be of 2" diameter, while the larger sections 15 and 16 may be, respectively, 6" and 4" pipes. Suitable drip openings 17 are provided at the bottom of the conduit 15 for removal of the aqueous condensate.

As illustrated in Fig. 4, the heat interchanger is preferably located underground, being laid in a concrete trough 18 and packed all around in sawdust or other suitable heat-insulating material 19. The trough is provided with a flanged wooden cover 20 which, for the purpose of shedding rain, etc., and for the further purpose of reflecting sunlight, is covered over with a thin polished nickel plate 21. The drip pipes 17 may be extended to suitable draw-off apparatus on or above the ground.

To prevent efflux of the mercury or other refrigerated body 11 in case the pressure on the incoming gas should for any reason become reduced, the inlet pipe 10 is provided with a bend 22 rising to a height above the level of the refrigerated liquid in the unit.

The refrigerated liquid is confined in a suitable metal receptacle 23 and fills the same only partially, a substantial space remaining above the liquid 11 to afford room for the condensed component indicated as 24 on the drawing. The receptacle 23 is provided with a head 25, to which the stripped gas outlet pipe 14 is connected, and a suitable outlet connection 26 is connected either to the lower portion of the head 25 or, as shown in the drawing, to the upper part of the receptacle 23. The pipe 26 is employed to remove the condensed product and leads to a suitable receiving or storage tank.

The refrigerated liquid 11 is maintained at the required low temperature by means of alcohol or other refrigerating liquid 27 which fills the jacket 28 surrounding the receptacle 23, the refrigerating liquid being preferably continuously circulated through the jacket and a suitable refrigerator plant, as indicated by the legends and arrows on the drawing, being returned to the refrigerator plant from the bottom of the jacket and supplied preferably at two or more points at the top of the jacket.

I prefer also as indicated in the drawing to refrigerate the liquid 11 from the inside as well as the outside, and to attain this result I provide an internal chamber 29, the interior whereof communicates at the bottom with the outer refrigerating chamber at 30, so that there is free passage and circulation between the body of refrigerating liquid 27 in the chamber 29 and the outer body. A portion of the refrigerating liquid coming from the refrigerator plant flows into the upper end 31 of the inner receptacle 29, and the portion of the chamber between the level of the refrigerated liquid 11 and the top of the unit is considerably reduced in cross section to enlarge the space provided for the condensed components 24. Refrigerating the body 11 from within as well as on the outside of its receptacle is especially important in case mercury is employed since the mercury takes up the heat from the gas so readily; and the provision of the interior vessel also has the advantage of providing additional contact surface for the gas in its passage upward. The outer jacket 28 is encased in suitable insulating material 32.

The head of the treater which is preferably above the top of the jacket 28 is of somewhat special form. It is removably held to the top of the receptacle 23 as by the bolt, nut and packing arrangement 33 in Fig. 2. Above the line of juncture of the head and the body of the receptacle 23 but below the stripped gas outlet, an annular groove 34 is formed, and in this groove is supported in any suitable manner a ring pipe 35. At diametrically opposed points pipes 36 and 37 communicate with the pipe 35 and extend through the wall of the head. Pipe 36 communicates with a suitable supply of warm water which enters the annular pipe 35 at one side of the head and flows out through the pipe 37 at the other side. The purpose of this arrangement is to thaw the condensed component in case it becomes ice or slush in the upper part of the unit. It will be noted that a free space 38 is left between the annular pipe 35 and the bottom of the groove 34 to permit free access of the separated component behind the pipe 35. To strengthen the head 25 in compensation for the groove 34, the head may be formed with an annular external boss 39 opposite the groove.

It is believed that the operation will be fully understood without further description.

In the appended claims I have defined the material separated in the unit by condensation as the "component." It is to be understood that in using this term I do not limit myself to any specific product or range of products which constitute the total condensable portion of the gas to be treated. Thus according to the claims a component may be a single hydrocarbon or a mixture of two or more hydrocarbons condensable within a certain range of temperature, or it may be the total condensable content of the gas.

I claim:—

1. The method of separating condensable hydrocarbon vapors from gases which comprises passing the gas through a column of liquid and maintaining the temperature of the liquid below the condensing temperature of the component to be separated by circulating a refrigerating liquid through a refrigerating plant and in heat-exchange relation to both the interior and exterior of the column.

2. The method of separating condensable hydrocarbon vapors from gases which comprises passing the gas through a column of mercury and maintaining the temperature of the mercury below the condensing temperature of the component to be separated by circulating a refrigerating liquid through a refrigerating plant and in heat-exchange relation to both the interior and exterior of the column.

3. The method of separating condensable hydrocarbon vapors from gases which comprises contacting the gas with a body of liquid the temperature whereof is so low that the extracted product is congealed, raising the temperature in a limited zone of the product and withdrawing the separated component from the zone as a liquid.

In testimony whereof, I affix my signature.

JOHN C. SWAN.